N. B. WOODHEAD.
FRICTION TRANSMISSION.
APPLICATION FILED JUNE 19, 1917.

1,262,897.

Patented Apr. 16, 1918.
2 SHEETS—SHEET 1.

Inventor
N. B. Woodhead,
By
Attorneys

Witness

N. B. WOODHEAD.
FRICTION TRANSMISSION.
APPLICATION FILED JUNE 19, 1917.
1,262,897. Patented Apr. 16, 1918.
2 SHEETS—SHEET 2.
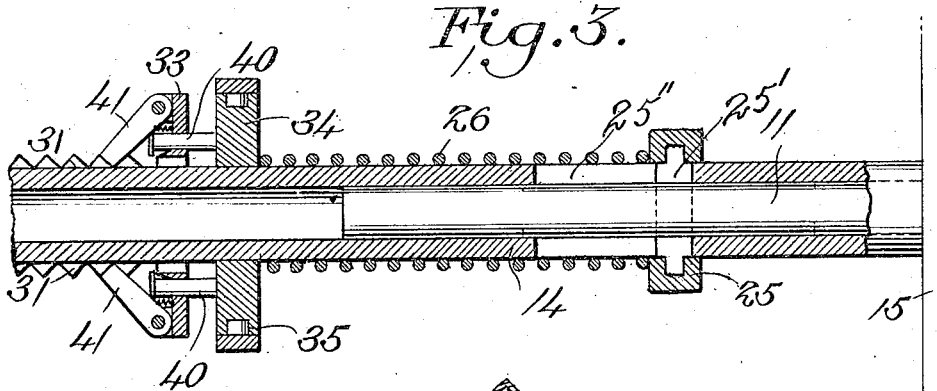
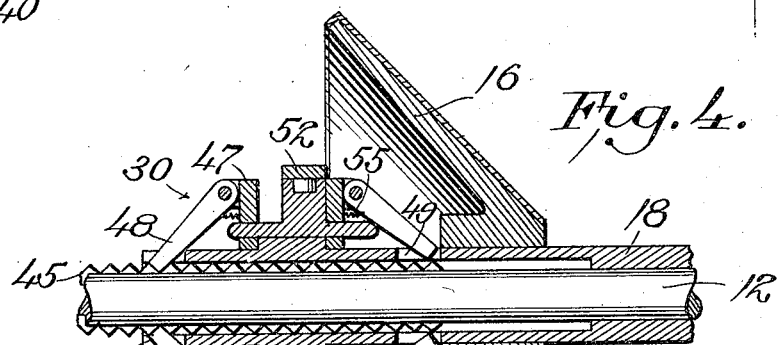
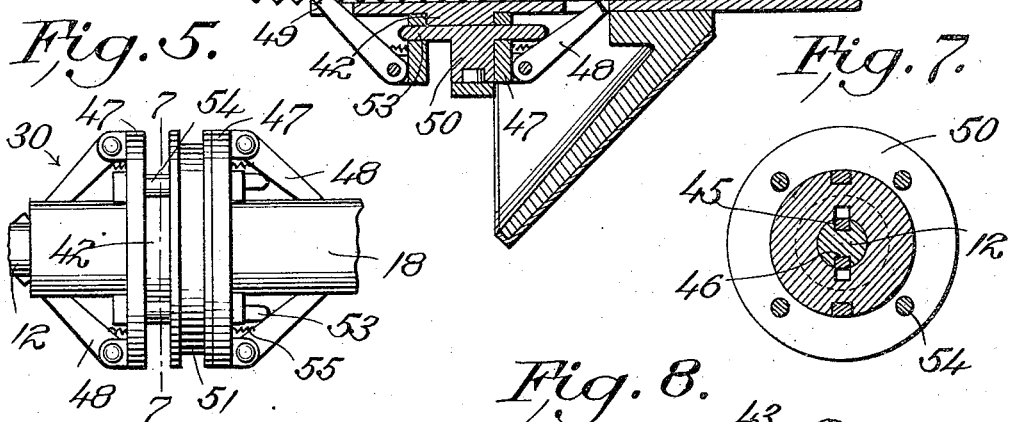
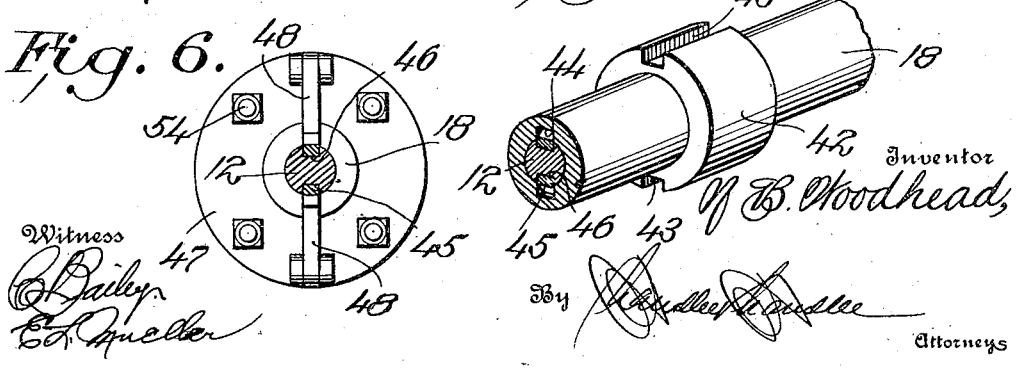

UNITED STATES PATENT OFFICE.

NORMAN B. WOODHEAD, OF CLAY CENTER, NEBRASKA, ASSIGNOR OF ONE-HALF TO GEORGE A. ALLEN, OF CLAY CENTER, NEBRASKA.

FRICTION TRANSMISSION.

1,262,897.     Specification of Letters Patent.     Patented Apr. 16, 1918.

Application filed June 19, 1917. Serial No. 175,664.

*To all whom it may concern:*

Be it known that I, NORMAN B. WOODHEAD, a citizen of the United States, residing at Clay Center, in the county of Clay, State of Nebraska, have invented certain new and useful Improvements in Friction Transmisson; and I do hereby declare the following to be a full, clear, and exact description of the invention, such as will enable others skilled in the art to which it appertains to make and use the same.

This invention is an improvement in power transmission and has particular reference to a bevel gear friction transmission.

An object of the invention is to provide an improved mechanism for locking the shiftable gears on the jack shaft of the transmission in adjusted positions.

Another object is the provision of an improved means whereby the friction between the drive and driven gears may be increased when the same are in different positions.

The inventive idea involved is capable of receiving a variety of mechanical expressions, one of which, for the purpose of illustrating the invention, is shown in the accompanying drawings, wherein:—

Fig. 3 is a longitudinal section through the drive shaft.

Fig. 4 is a similar section through the jack shaft.

Fig. 5 is an enlarged detail side elevation of the locking mechanism employed in connection with the invention.

Fig. 6 is a transverse section through the jack shaft showing the locking mechanism in elevation.

Fig. 7 is a transverse section on the line 7—7 of Fig. 5.

Fig. 8 is a fragmentary perspective view of the sleeve member forming a part of the mechanism.

Figure 1:
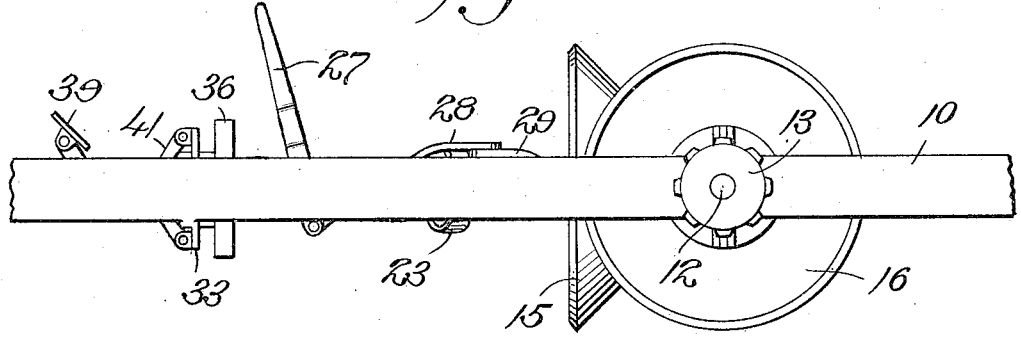
Figure 1 is a side elevation of a portion of a motor vehicle showing the transmission applied thereto and constructed in accordance with the invention.
Figure 2:
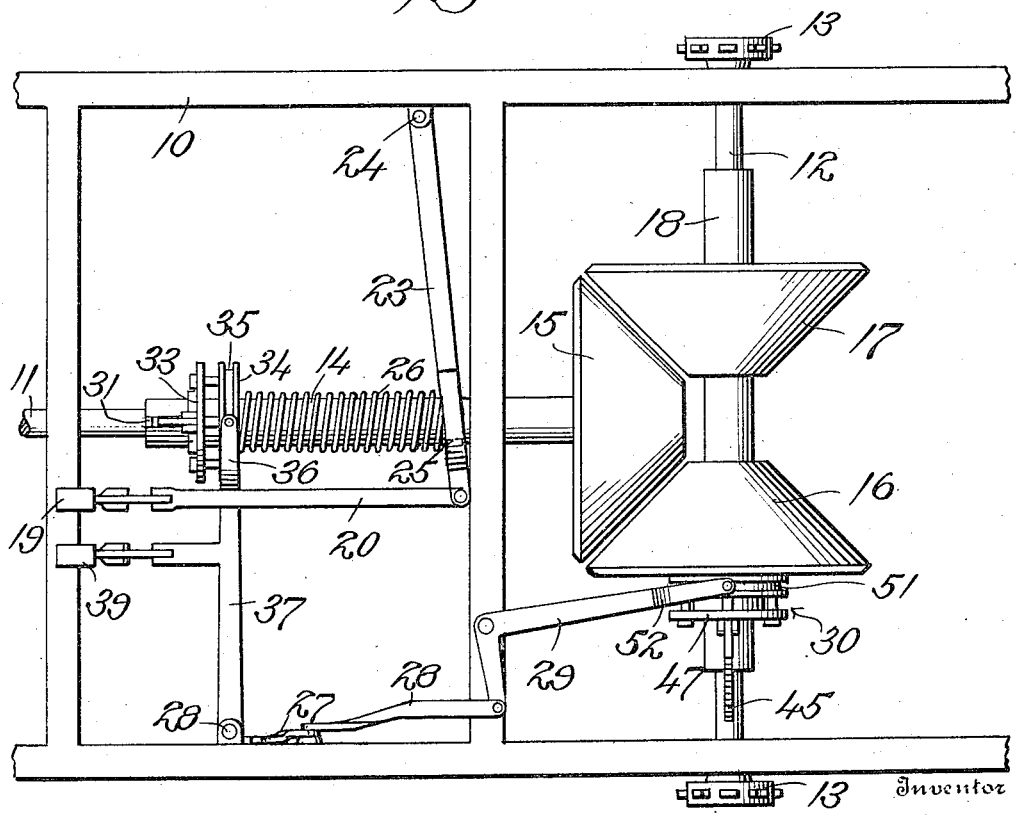
Fig. 2 is a top plan view.

The accompanying drawings illustrate what is now believed to be a preferred form of the invention wherein the frame or chassis 10 of a motor vehicle has journaled longitudinally thereof the drive shaft 11 and transversely thereof the jack shaft 12 having the usual sprocket wheels 13 or other power transmitting devices on its ends. Movable longitudinally of the drive shaft 11 and surrounding the same is a sleeve member 14 the rear end of which carries a friction bevel or cone drive gear 15 with which is associated the similarly constructed gears 16 and 17 mounted upon a sleeve 18 movable longitudinally of and surrounding the jack shaft 12, the gear 17 being the reverse gear. The engaging surfaces of all of said gears are preferably lagged or faced with compressed paper to prevent slipping thereof. When the gears are in the neutral position, shown in Fig. 1, the gear 15 is out of contact with both of the gears 16 and 17 and in order to drive the jack shaft 12 the gear 15 is first shifted longitudinally of the drive shaft through the medium of the clutching lever 19 pivoted to the frame and having a connecting rod 20 secured thereto, the other end of said rod having a similar rod 23 pivoted thereto and to the frame 10 at the point 24, said rod 23 engaging a collar 25 surrounding the sleeve 14 and engaging a key 25′ mounted to slide in a key way 25″ in said sleeve, so that when the lever 19 is actuated the coil spring 26 will first be compressed until the key 25′ reaches the other end of the key way 25″, as shown in Fig. 3, and then the sleeve 14 will be drawn forwardly to impart a similar movement to the gear 15. This compression of the coil spring will exert a pressure upon the gear 15 to increase the friction between said gear and either of the gears 16 and 17 after the latter have been adjusted into contact with the gear 15 and the lever 19 released. A shifting lever 27 is also pivoted to the frame and connected by rods 28 and 29 to the locking mechanism generally indicated by the numeral 30 mounted on and rotatable with the sleeve 18 surrounding the jack shaft 12 so that when the shifting lever 27 is operated in either direction the sleeve 18 will be adjusted longitudinally of the jack shaft and cause either of the gears 16 or 17 to engage the gear 15 at which time the gears will be in low speed and the lever 19 may then be released. Then by again operating the lever 27 to throw the gear 16 or 17 away from the gear 15 the spring 26 will expand and force the gear 15 rearwardly and thus shift from low to high speed.

When the gears are in high speed the spring 26 will not always be of sufficient tension to exert the necessary pressure upon the gear 15 to produce the desired friction between the gears, and in order to overcome this difficulty, the present invention includes means for regulating the pressure of the spring 26 and increasing the same when necessary. This means preferably includes a pair of oppositely disposed racks 31 formed upon the sleeve 14 longitudinally thereof. Slidable on the sleeve 14 adjacent the racks 31 is a plate 33 and a second relatively adjustable plate 34, the latter plate having a grooved periphery 35 for receiving a yoke member 36 connected to a rod 37 pivoted to the frame 10 at 38. An operating lever 39 is pivoted to the forward portion of the frame 10 and connected to the rod 37 intermediate its ends so that when said lever 39 is actuated in one direction the plates 33 and 34 may be shifted longitudinally of the sleeve 14 and when actuated in the other direction said plate 34 will at first be adjusted relative to the plate 33 and then both plates will be adjusted together. This plate 34 carries a pair of pins or arms 40 which extend through openings in the plate 33 and have their free ends adapted for engagement with the pawls 41 pivoted to the plate 33 and adapted for engagement with the teeth of the racks 31 to prevent movement of the sleeve in one direction. Now should it be desired to increase the tension of the spring 26 the lever 39 is operated in a direction to cause the yoke member 36 to force the plate 34, and consequently the plate 33, rearwardly relative to the sleeve 14, and thus compress said spring whereby the tension thereof will be increased to produce greater pressure upon the gear 15. During this rearward movement the pawls 41 will ride freely over the teeth of the racks but will engage said teeth to prevent any forward movement of the plates 33 and 34 until the lever 39 is actuated in the opposite direction whereupon the pins 40 will disengage the pawls 41 from the racks and the spring 26 will return all of the parts in a forward direction.

The locking means 30, employed for the purpose of locking the gears 16 and 17 in their adjusted positions, is somewhat similar in construction to the locking means just described and in connection with said locking means 30 the sleeve 18 is provided with a collar 42 having oppositely disposed longitudinal grooves 43. The interior of said sleeve is also provided with the oppositely disposed and longitudinally extending groove 44 which receive the toothed edges of the rack bars or members 45 mounted in the oppositely disposed keyways 46 extending longitudinally of the jack shaft 12 mounted upon the sleeve member 18 and engaging the ends of the collar 42 are the end plates 47 of the locking device, each of said plates having pivoted thereto at oppositely disposed points the locking pawls 48. The free ends of the pawls of one plate are adapted to extend through adjacent oppositely disposed openings 49 in the sleeve member 18 and engage the teeth of the racks 45 to prevent movement of the sleeve member and locking device in one direction while the pawls of the other plate are disengaged from said rack teeth through the medium of a mechanism to be presently described. The pawls that are in engagement with the racks 45 may be disengaged therefrom and the opposite pawls will automatically engage said racks to prevent any movement of the sleeve in an opposite direction. The mechanism for accomplishing this result preferably comprises an intermediate adjusting plate 50 having a grooved periphery 51 for receiving the yoke end 52 of the rod 29 which is connected to the shifting lever 27. This plate 50 is slidable upon the collar 42 between the plates 47 and is provided with transverse pins or arms 53 extending on each side of the plate 50 and slidable in the grooves 43 of said collar 42 with their free ends adapted to contact the pawls 48 to disengage the same from the racks 45. The plates 47 and 50 are connected together by bolts 54 which extend through said plates and connected to opposite pawls 48 are the small coil springs 55 which normally exert a pull upon the pawls 48 in order to cause the same to engage the racks 45 but it will be apparent that when the plate 50 is shifted through the medium of the lever 27 in either direction the ends of the pins or arms 33 will engage certain of the pawls 48 and cause the free ends thereof to be released from said racks 45 while the opposite pawls will engage said racks. It will also be apparent that when the plate 50 contacts the inner surface of either of the plates 47 further adjustment of the lever 27 will cause the entire sleeve 18 to be shifted longitudinally of the jack shaft and thus shift either of the gears 16 or 17 into engagement with the gear 15.

What is claimed is:—

1. In a power transmission mechanism, the combination of a main drive shaft, a jack shaft, gears shiftable longitudinally of said jack shaft, a mechanism associated with said jack shaft for locking the gears thereon in adjusted positions and including rack members carried by said jack shaft, and pawls engageable with said rack members to prevent movement of the mechanism in one direction.

2. In a power transmission mechanism, the combination of a main drive shaft, a jack shaft, gears shiftable longitudinally of said jack shaft, a mechanism associated with said jack shaft for locking the gears thereon in adjusted positions and including rack members carried by said jack shaft, pawls engageable with said rack members to prevent movement of the mechanism in one direction, and shiftable means for disengaging said pawls from said rack members to permit the gears on said jack shaft to be returned to normal position.

3. In a power transmission mechanism, the combination of a main drive shaft, a jack shaft, gears shiftable longitudinally of said jack shaft, a mechanism associated with said jack shaft for locking the gears thereon in adjusted positions and including rack members carried by said jack shaft, pawls engageable with said rack members to prevent movement of the mechanism in one direction, and means for disengaging said pawls from said rack members and returning the gears on said jack shaft to normal positions.

4. In a power transmission mechanism, the combination of a main drive shaft, a jack shaft, gears shiftable longitudinally of said shafts, rack members carried by said jack shaft, a sleeve movable longitudinally of said jack shaft and carrying the gears thereon, end plates supported by said sleeve, a pair of pawls pivoted to said end plates and engageable with said rack members, each pair of pawls preventing movement in one direction of said sleeve longitudinally of said jack shaft, an intermediate plate slidable on said sleeve between said end plates, and means carried by said intermediate plate and engageable with one pair of pawls when said intermediate plate is adjusted to disengage said pair of pawls from said rack members to permit of longitudinal movement of the sleeve in one direction.

In testimony whereof, I affix my signature in the presence of two witnesses.

NORMAN B. WOODHEAD.

Witnesses:
R. A. BYRKIT,
GEORGE A. ALLEN.

Copies of this patent may be obtained for five cents each, by addressing the "Commissioner of Patents, Washington, D. C."